(12) United States Patent
Ramsey

(10) Patent No.: US 6,889,199 B2
(45) Date of Patent: May 3, 2005

(54) METHOD AND APPARATUS FOR ENCODING AND GENERATING TRANSACTION-BASED STIMULUS FOR SIMULATION OF VLSI CIRCUITS

(75) Inventor: Clinton M. Ramsey, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 09/728,135

(22) Filed: Nov. 30, 2000

(65) Prior Publication Data

US 2002/0065641 A1 May 30, 2002

(51) Int. Cl.[7] .............................................. G06F 17/50
(52) U.S. Cl. ........................... 705/16; 705/17; 717/135
(58) Field of Search .............................. 703/13, 14, 15, 703/16, 17, 26, 28; 714/738; 717/135

(56) References Cited

U.S. PATENT DOCUMENTS

| | | | | |
|---|---|---|---|---|
| 4,527,249 A | * | 7/1985 | Van Brunt | 703/15 |
| 5,157,620 A | * | 10/1992 | Shaar | 703/16 |
| 5,649,164 A | * | 7/1997 | Childs et al. | 703/16 |
| 5,956,476 A | | 9/1999 | Ranson et al. | 395/183.06 |
| 6,018,623 A | | 1/2000 | Chang et al. | 395/500.07 |
| 6,751,752 B1 | * | 6/2004 | Smith | 714/39 |

FOREIGN PATENT DOCUMENTS

| | | |
|---|---|---|
| EP | 2219419 A | 12/1989 |
| JP | 550147742 | 11/1980 |
| JP | 060215062 | 8/1994 |
| JP | 070099741 | 4/1995 |

OTHER PUBLICATIONS

"Statistical Modeling for Efficient Parametric Yield Estimation of MOS VLSI Circuits" Paul Cox et al., IEEE Trans. Electron. Devices, vol. ED–32 No. 2, pp. 471–478, 1985.

* cited by examiner

*Primary Examiner*—Leo Picard
*Assistant Examiner*—Carlos Ramon Ortiz Rodriguez

(57) ABSTRACT

The invention comprises a method and system for encoding and generating transaction-based stimuli event states for the eventual application to the simulation of VLSI circuits. In the invention, each test state input is described by a vector where that vector is characterized by two symbols. The first symbol is the "stride" which references its relative time of reoccurrence among the test state inputs. The second symbol denotes the specific transaction on that stride. The stride is a number that is incommensurate relative to the other strides of the transactions.

20 Claims, 5 Drawing Sheets

| TEST CASE TABLE | | | | | |
|---|---|---|---|---|---|
| STRIDE | 101 | 137 | 173 | 211 | • • • |
| TC1 | R | W | T | 0 | • • • |
| TC2 | Q | R | W | T | • • • |
| • | • | • | • | • | |
| • | • | • | • | • | |
| • | • | • | • | • | |

401

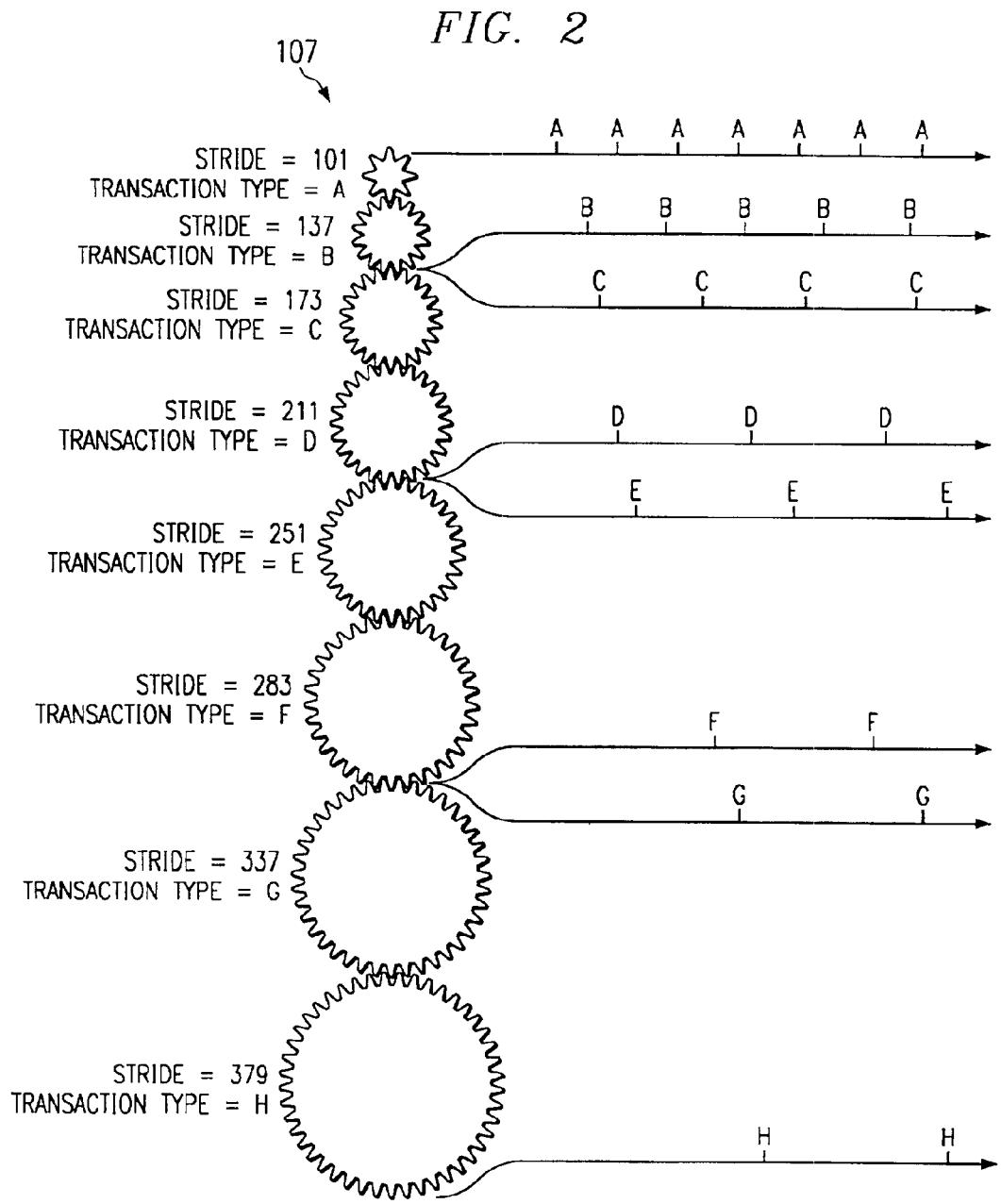

| TEST CASE TABLE ||||||
|---|---|---|---|---|---|
| STRIDE | 101 | 137 | 173 | 211 | ... |
| TC1 | R | W | T | 0 | ... |
| TC2 | Q | R | W | T | ... |
| ⋮ | ⋮ | ⋮ | ⋮ | ⋮ | ⋮ |

| COMMAND TABLE ||||
|---|---|---|---|
| COMMAND | FUNCTION | BUS COMMAND | CORNER CASE |
| 0 | NO OP | -- | -- |
| Q | GEN_EXT_COMMAND | READ | -- |
| R | GEN_EXT_COMMAND | READ | DIRTY |
| W | GEN_INT_COMMAND | WRITE | -- |
| T | GEN_INT_COMMAND | FLUSH | -- |
| ⋮ | ⋮ | ⋮ | ⋮ |

METHOD AND APPARATUS FOR ENCODING AND GENERATING TRANSACTION-BASED STIMULUS FOR SIMULATION OF VLSI CIRCUITS

RELATED APPLICATIONS

The present application is related to concurrently filed, co-pending, and commonly assigned U.S. patent application Ser. No. 09/727,188, entitled "METHOD AND APPARATUS FOR GENERATING TRANSACTION-BASED STIMULUS FOR SIMULATION OF VLSI CIRCUITS USING EVENT COVERAGE ANALYSIS," the disclosure of which is hereby incorporated herein by reference.

TECHNICAL FIELD

This invention relates in general to generating and applying test transaction stimuli to test VLSI circuits.

BACKGROUND

Simulating integrated circuits has proved to be a very useful process for finding circuit design problems before product release. In particular, known testing techniques have been directed to CPUs (central processing units) and associated buses. Typically, in testing VLSI (very large-scale integrated) circuits such as these, a large number of different test cases are processed in order to uncover problem states. An example of test cases may be found in U.S. Pat. No. 5,956,476 to Ransom et al., which is incorporated herein by reference. In previous approaches, a large number of cases might be randomly generated by specifying a weighted mix of transaction (e.g., read, write) types. For example, a mixture of 20% reads and 80% writes might be generated. Using random generation, the timing relationship between any of the events is neither specified nor controllable.

FIG. 8 illustrates an exemplary topology utilized by known circuit simulation techniques. VLSI 801 is associated with two separate stimuli: internal BUS 802 and external bus 804 of BUS interface unit 803. It is appropriate to generate a number of test states associated with these two stimuli. Most pairs of stimuli do not lead to any problems. Accordingly, it is appropriate to isolate the problem states (i.e., pairs of stimuli) that give rise to circuit malfunction. In addition, it shall be appreciated that there is an additional degree of freedom associated with problem states. Specifically, problem states that are separated in time may nevertheless lead to problematic circuit behavior.

Test cases for application to such a system topology may be randomly generated. Random generation is illustrated in Cox, P., et al. "Statistical Modeling for Efficient Parametric Yield Estimation of MOS VLSI Circuits", IEEE Trans. Electron. Devices, vol. ED-32 No. 2, 471–478, 1985, which is incorporated herein by reference. Other examples of random generation of test cases include U.S. Pat. No. 6,018,623 to Chang et al., which is incorporated herein by reference.

Also, known techniques utilized to ascertain problem states include manual development of test cases. For example, a transaction might be set up on an external BUS at time $t_0$ and then have a transaction injected onto the internal BUS at a time $t=t_0-t_A$. Also, $t_A$ is initially set to equal $t_1$ and successively varied until t equals time $t_0$. Also, $t_A$ may be varied until it reaches $-t_1$. The hypothesis is that if there is any important timing relationship between the two transactions, that relationship would be discovered by exhaustively iterating the relative times of the two transactions.

Random generation of test states is fairly automatic. However, the amount of computational effort necessary to cover desired events can be very large. Also, random generation is problematic in that it is often difficult to repeat problem states. For example, if something changes in the execution of the model of the circuit under test, a purely random string of transactions may not re-trigger that event. Alternatively, handwritten generation of test states may identify problem states more easily. However, handwritten generation of states requires extensive hand coding by someone who has extensive knowledge of the system under test. Specifically, this technique requires significant input from highly skilled personnel.

SUMMARY OF THE INVENTION

The present invention is directed to a method and system for encoding or describing and generating transaction-based stimuli event states for eventual application to the simulation of VLSI circuits. In the invention, each test state input is described by a vector that is characterized by two symbols. The first symbol is the "stride" which references its relative time of reoccurrence among the test state inputs. The second symbol denotes the specific transaction on that stride.

Using the invention, the test states can be exhaustively generated. In generating test states, one or more transactions are used with each transaction being preferably composed of a function and a bus command. The stride for issuing the transaction is incommensurate with respect to the strides of the other transactions, for example each stride is a prime number. The total set of input stimuli for a given test case is characterized by a set of vectors, $V_1, V_2, \ldots V_N$, where each of the vectors is described by its stride, $S_{tj}$, and its transaction number, $T_{nk}$, so that the initial state has the description: $TC_1\{V_1[S_{t1}, T_{n1}], V_2[S_{t2}, T_{n2}], \ldots V_N[S_{tN}, T_{nN}]\}$. Each transaction occurs at its initial time or stride, and at integer multiples of that stride.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, reference is now made to the following descriptions taken in conjunction with the accompanying drawing, in which:

FIG. 2 illustrates several strides of the inventive generator, each with a transaction type at the stride intervals, where the inter-operation of the strides is shown allegorically in terms of non-seeking gears;

DETAILED DESCRIPTION

An embodiment of this invention comprises a method and apparatus for encoding and generating transaction-based stimuli event states for the eventual application to the simulation of VLSI circuits. In the preferred embodiment of the invention, each test state input is described by a vector where that vector is characterized by a series of pair values. The first value of the pair is the "stride" which references a relative time of reoccurrence among the test state inputs. The second value of the pair denotes the specific transaction on that stride. If the values of the strides are fixed and the same for each of the vectors, then the vectors need only comprise a single value, namely the specific transaction, in a particular order. The particular order of the transactions would imply the stride value for each of the transactions. For example, given strides of 7, 11, 13, 17, then a vector comprising A, B, C, D transactions would be interpreted as A 7, B 11, C 13, and D 17. Similarly, a vector comprising W, J, D, M, would be interpreted as W 7, J 11, D 113, M 17. Each transaction preferably comprises a function, bus command, and corner case information. The stride, or reoccurrence time, for each transaction is preferably set to a predetermined value that is incommensurate relative to the other transactions being tested.

Figure 1:
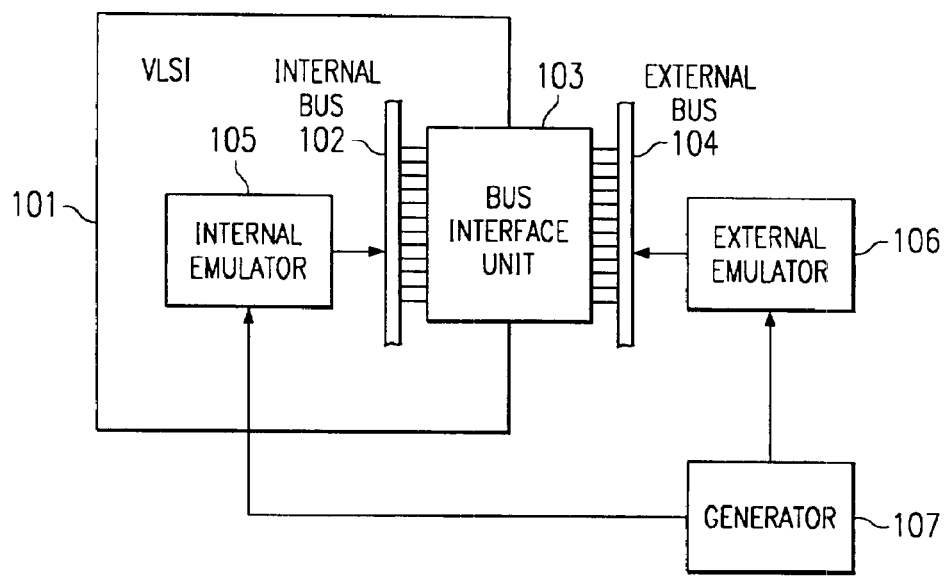
FIG. 1 illustrates an emulated VLSI circuit with a bus interface block, an internal bus, and an external bus, and using the invention.

The circuit of FIG. 1 may be used as an example circuit 101 for simulation using the invention. The bus interface block 103 translates transactions between the internal bus 102 and the external bus 104. On either side of each bus, in the simulation, is an emulator which can inject transactions onto that bus. The internal emulator 105 places transactions onto bus 102 and external emulator 106 places transactions onto bus 104. The transactions are then delivered to the bus interface unit 103, which is the unit under test. The inventive generator 107 instructs the emulators as to which transactions to place on the buses and when to place them onto the buses. Other tools (not shown) watch both buses and the bus interface, and check that the simulation(s) has run correctly, as these tools know what results to expect from the transactions. Thus, incorrect behavior can be identified. Note that circuit 101 is shown by way of example only, as other circuits could be used. For example, a circuit involving only one bus or a circuit where a different device is under test.

During operations, a variety of transactions can be delivered to the interface at different times, and the interface needs to operate properly. To ensure such proper operations, the simulation should send a variety of transactions at different times. With the circuit shown in FIG. 1, simulated transactions (or stimuli) should be delivered to both sides of the interface. Most stimuli should not cause problems in the circuit under test. If any do cause problems, problems would be isolated and repairs, modifications or other changes would then be made to the design of the circuit. Further simulation would verify the changes have corrected the problem.

The inventive generator instructs the emulators on when to issue transactions and which transactions to issue. The generator is preferably envisioned as a gear system, as shown in FIG. 2. Each gear would initiate the issuance of a transaction after one cycle of the gear. Each gear of FIG. 2 is comprised of a number of teeth, with each tooth representing one simulation time unit. So that the different transactions issue at different times, each gear would have a different number of teeth. Moreover, to prevent frequent coincidence of the same transaction states, incommensurate numbers are preferably used, e.g. prime numbers. Coincidence of the same transaction states indicates that the same transaction states are being repeated, and thus presents a waste of simulation time. Larger prime numbers are preferably used to move coincidence occurrences to even higher time counts. For example, if gears having 4 and 8 teeth are used to issue transactions A and B, respectively, then coincidence of occurrence would occur at every 8 time units, i.e. every issuance of B would also have an issuance of A. As another example, consider if gears having 3 and 7 teeth are used to issue transactions C and D, respectively, then coincidence of occurrence would occur at every 21 time units, i.e. C would issue at 3, 6, 9, 12, 15, 18, 21, . . . time units while D would issue at 7, 14, 21, 28, . . . time units. Thus, coincidence of occurrence would occur at every 21 units. As a further example, consider if gears having 101 and 137 teeth are used to issue transactions E and F respectively, then coincidence of occurrence would occur at every 13,837 time units.

The generator 107 of FIG. 2 is shown to include 8 gears, and thus is capable of issuing up to 8 different transactions. Note that this is by way of example only as the generator can comprise more or fewer gears to issue more or fewer transactions. Also note that the same transaction can be issued by more than one gear. FIG. 2 also depicts the strides of the gears as prime numbers between 100 and 400. Note that this range is by way of example only, as other ranges could be used, e.g. between 50 and 600. There are 53 prime numbers in the range of 100–400, and FIG. 2 shows that 101, 137, 173, 211, 251, 283, 337, and 379 have been selected for use with the generator 107. Note that the selected numbers are by way of example only, as other prime numbers in the range could have been used.

Figure 3:
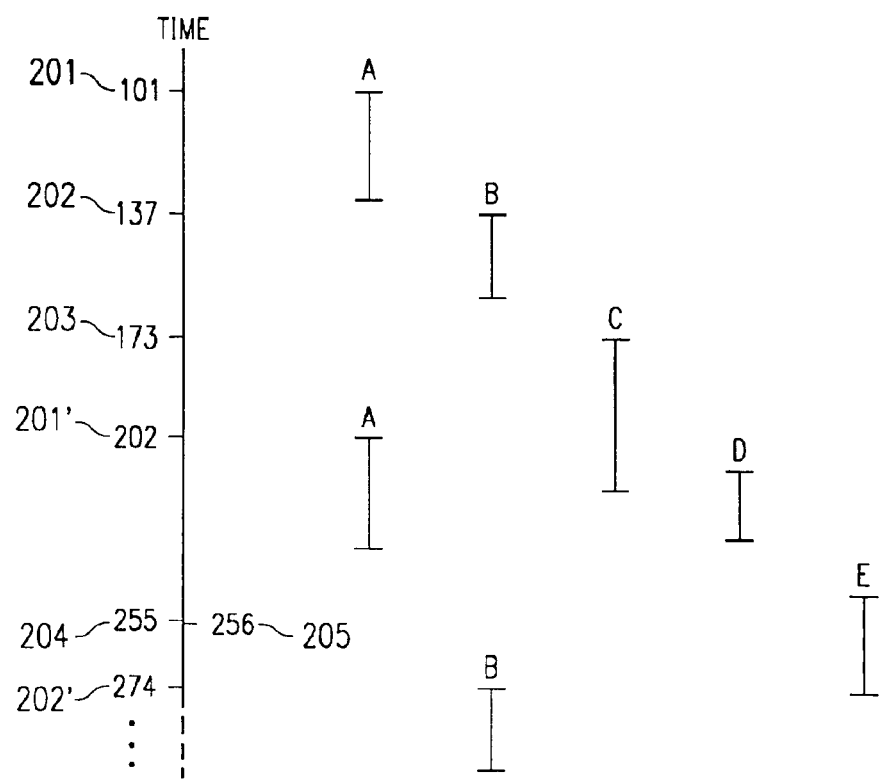
FIG. 3 illustrates transactions A, B, C, D, and E generated at various stride times.

As shown in FIG. 2, generator 107 would initiate transaction A at intervals of 101, e.g. 101, 202, 303, 404, 505, etc. The generator would also initiate transaction B at intervals of 137, e.g. 137, 274, 411, 548, 685, etc. The generator would further initiate transactions C–H at their respective stride intervals. Thus, as shown in FIG. 3, the generator would initiate various transactions according to their respective strides. At time 101, transaction A is initiated, at times 137, 173, transactions B and C are respectively initiated. A time 202 transaction A is initiated again, and so on. Also note that the transactions may be of differing lengths, some of which may overlap each other. The transactions used for the simulation are transactions that are associated with the device under test. For example, transactions for the interface from the CPU core include: a load miss, a load miss replacing dirty data in the cache and a store miss replacing dirty data in the cache, and transactions arising from the external bus are transactions such as: a read-private snoop from another processor, a read-shared snoop from another processor and a read-private snoop which would intentionally dirty the data when it is returned to the emulator. These transactions are listed by way of example only as other transactions could be used, e.g. write or read.

Figures 4A, 4B, 4C:
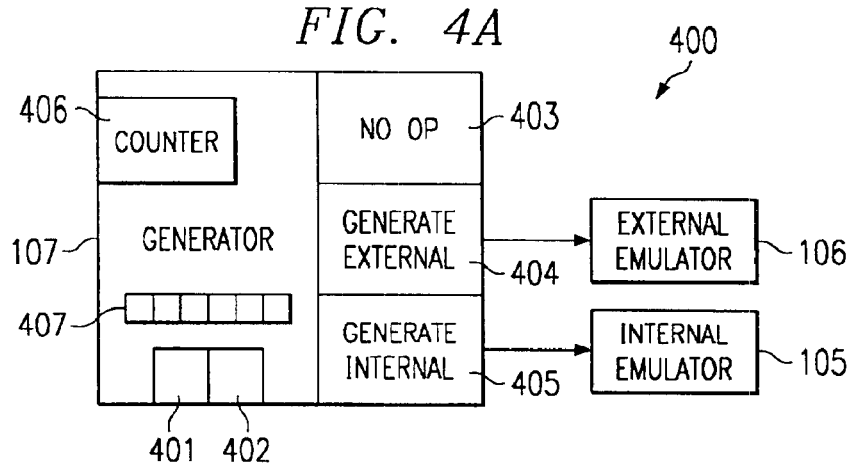
FIGS. 4A–4C illustrates the internal components of the inventive generator.

FIG. 4A depicts a preferred embodiment of the generator 107. The generator includes user created tables 401 and 402, which are depicted in FIGS. 4B and 4C, respectively. The generator includes three functions for controlling the emulators 105, 106, namely no op, which does nothing, generate external 404, which issues commands to the external emulator 106, and generate internal 405, which issues commands to the internal emulator 105. The emulators 105, 106, in turn, issue commands to their respective buses, which are then provided to the bus interface unit 103, which is the unit under test. The no-op function is a place holder function which does not place any commands on the bus. This is used to relieve bus congestion. The generator also includes counter 406 that tracks the accumulated time units of the simulation. Note that tables 401, 402 and functions 403, 404, 405 are shown as components of the generator. However, any of these elements may be separate from the generator, but still accessible by the generator.

Figure 5:
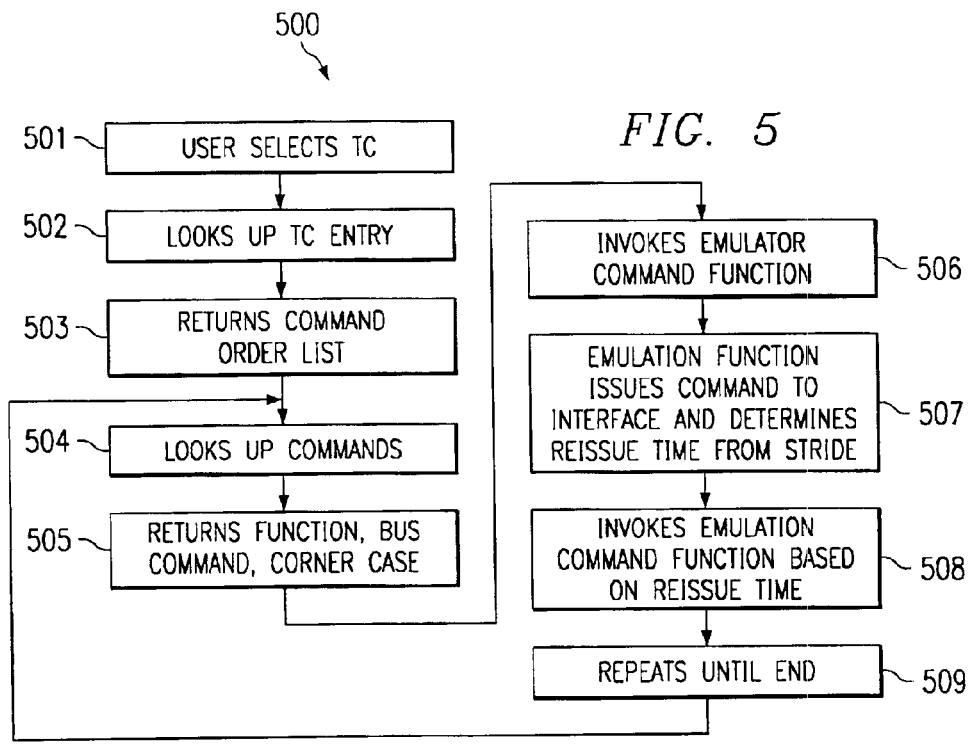
FIG. 5 illustrates a flow chart of operations of the inventive generator of FIG. 4.

The preferred operation of the generator is explained in conjunction with the flow chart of FIG. 5. The simulation begins by the user selecting a test case 501. Test cases are stored in table 401 of FIG. 4B. The generator looks up the test case entry 502, and returns the transaction command list for the selected test case. Since all of the test cases in table 401 have the same strides, only the order of the commands needs to be returned 503. If each test case used different strides, then the strides associated with each transaction command of the selected test case would have to be returned as well. Such strides would be shown as additional entries in the table, with each such entry associated with a transaction command. For example, if the user selects TC1, then the command list of R, W, T, O . . . is returned.

The generator then looks up 504 the first command on the list, for example R, in the command table 402, which is shown in FIG. 4C. This look-up returns 505 the function 403–405, the bus command, and corner case information associated with the transaction command. The corner case is an additional parameter or text string containing one or more modifiers which will alter the execution of the associated bus transaction by the emulator. The generator then invokes 506 the proper function, 403, 404, 405 based on the information from the look-up. The generator provides the function 404, 405 with the bus command, stride, and corner case information (if present). For example, for transaction R, the generator provides the stride of 101, the bus command read, and corner case information of dirty to the generate\_ external function 404.

The function 404, 405 then invokes 507 its associated emulator 106, 105 to issue the bus command onto the associated bus 104, 102 which will then be received by the interface 103. It is preferable to have the functions 403, 404, 405 read the current time unit from counter 406 and determine 507 the next time that the transaction command should be initiated based on the stride, however this operation may be performed by the generator or some other entity. The time of the next reissue of the transaction is then returned to the generator. The generator then re-invokes 508 the function 403, 404, 405 when the counter 406 reaches the designed reissue time. Note that the reissue times for each of the transactions would be maintained by the generator in separate registers 407, which may be either internal or external to the generator. The reissuing is repeated until a predetermined event indicates that the simulations should be ended 509, e.g. upon discovery of a problem, reaching a predetermined time period, etc.

The above operations are repeated for each transaction command in the test case. For example, after processing R, the generator would then process W, T, O . . . . Note that the processing of the transaction commands is not handled sequentially (i.e. R is completed before W is started), so that multiple transactions are being sent to the interface. Consequently, all functions are called at time 0 and calculate when they should be first called, e.g. 101, 137, 173, etc. based on the strides. These values are then loaded into the registers 407. When the generator notes that counter 406 matches a register, it invokes the appropriate function. The function then updates the register for the next reissue call.

Figure 6A:
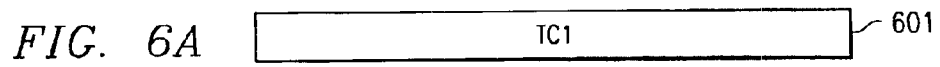
FIGS. 6A–6C depict the inventive handling of a large test case.
Figure 6B:
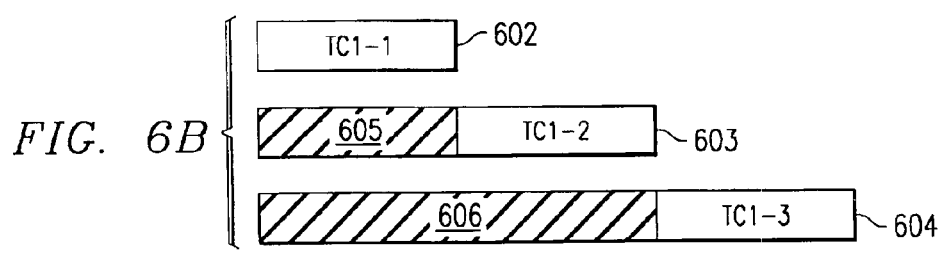
Figure 6C:
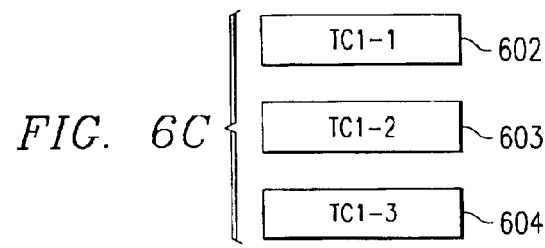

As shown in FIG. 6A, some test cases 601 may require large amounts of time. Thus, it is desirable to break up such test cases into smaller pieces, as shown in FIG. 6B. For example at the conclusion of the first piece 602, the contents of the registers 407 would be stored. When the next piece 603 is to be performed, the contents of the stored values would be loaded back into the registers. Similarly, the values at the conclusion of piece 602 would be stored for use in performing 603. However, counter 406 will start from zero and count up. This results in dead time 605 and 606, which is an undesirable waste of time. Since the states Of the transactions (timing relationships) are important and not the specific values of the next reissue, each of the registers can be decremented by an appropriate amount, which is the same for each register. This will allow for the testing of the pieces 602, 603, 604 to start earlier as shown in FIG. 6C. For example, suppose that the registers contain the values of 50500 (for a stride of 101), 50553 (for a stride of 137), and 50516 (for a stride of 173). This would mean that 50500 time units would have to pass until the next transaction is issued. The next issues for these transactions would occur on 50601, 50690, 50689 respectively. The numbers themselves are not important, but rather the timing differences between them is important. By subtracting, for example, 50490 from each register value, the values are 10, 63, 26, respectively. The next issues would then be 111, 200, 199. Note that the timing relationships are the same between the (111, 200, 199) group as with the (50601, 50690, 50689) group. This subtraction allows for failed states to be easily rechecked to reconfirm the failing state or to see if a modification has corrected the problem.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 7:
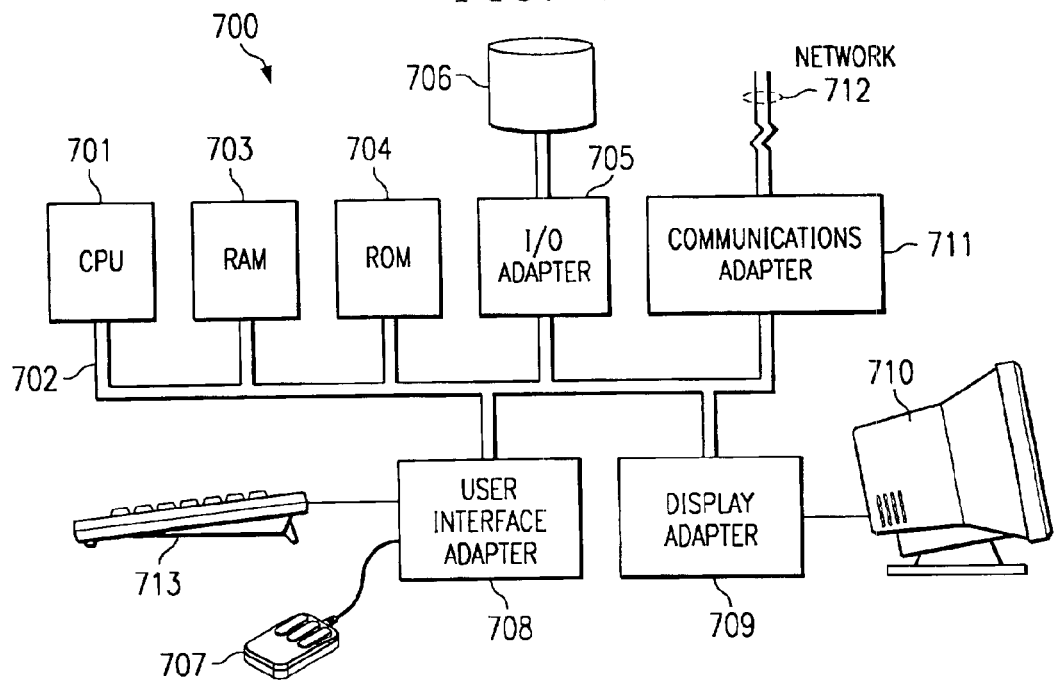
FIG. 7 depicts a block diagram of a computer system which is adapted to use the present invention.
Figure 8:
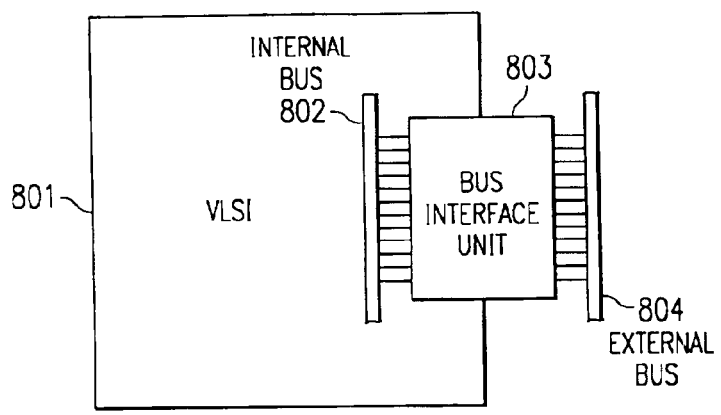
FIG. 8 illustrates an emulated VLSI circuit of the prior art with a bus interface block, an internal bus, and an external bus.

FIG. 7 illustrates computer system 700 adapted to use the present invention. Central processing unit (CPU) 701 is coupled to system bus 702. The CPU 701 may be any general purpose CPU, such as an HP PA-8500 or Intel Pentium processor. However, the present invention is not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O card 705 connects to storage devices 706, such as one or more of a hard drive, a CD drive, a floppy disk drive, or a tape drive, to the computer system. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713 and pointing device 707, to computer system 700. Display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, or steps, presently existing or later to be developed that perform substantially the same function or achieve substantially the same result as the corresponding embodiments described herein may be used according to the present invention. Accordingly, the appended claims are intended to include within their scope such processes, machines, manufacture, compositions of matter, means, methods, or steps.

What is claimed is:

1. A method for testing a device using a plurality of transactions for simulation, the method comprising the steps of:
   providing a plurality of prime numbers;
   associating each transaction of the plurality of transactions to a respective prime number of the plurality of prime numbers;
   engaging each transaction to the device at a particular simulation time that is based on the associated prime number of each transaction; and
   repeating the step of engaging for each transaction when the simulation time is an integer multiple its associated prime number.

2. The method of claim 1 wherein a portion of the plurality of transactions form a test case, and the step of engaging comprises the steps of:
   looking up the test case in a table of test case entries;
   locating a list of transactions associated with the test case;
   looking up each transaction of the list of transaction in a table of transactions;
   locating information associated with each transaction in the table; and
   invoking a function for each transaction based on the information.

3. The method of claim 2 further comprising the step of:
   invoking an emulator, via the function, to issue a command to the device based on the transaction.

4. The method of claim 1 wherein the step of repeating comprises the steps of:
   storing the particular simulation time in a memory;
   calculating a subsequent particular simulation time by adding the prime number to the particular simulation time; and
   storing the subsequent particular simulation time after completion of the step of engaging.

5. The method of claim 1 further comprising the step of:
   selecting the plurality of prime numbers as non-identical prime numbers.

6. The method of claim 5 comprising the step of:
   selecting the plurality of prime numbers from the integers between 100 and 400.

7. The method of claim 1 further comprising the step of:
   incrementing a counter to represent the simulation time.

8. A system for testing a device using a plurality of transactions for simulation comprising:
   means for providing a plurality of prime numbers;
   means for associating each transaction of the plurality of transactions to a respective prime number of the plurality of prime numbers;
   means for engaging each transaction to the device at a particular simulation time that is based on the associated prime number of each transaction; and
   means for repeating the means for engaging for each transaction when the simulation time is an integer multiple its associated prime number.

9. The system of claim 8 wherein a portion of the plurality of transactions form a test case, and the means for engaging comprises:
   means for looking up the test case in a table of test case entries and locating a list of transactions associated with the test case;
   means for looking up each transaction of the list of transaction in a table of transactions and locating information associated with each transaction in the table; and
   means for invoking a function for each transaction based on the information.

10. The system of claim 9 further comprising:
    means for invoking an emulator, via the function, to issue a command to the device based on the transaction.

11. The system of claim 8 wherein the means for repeating comprises:
    means for storing the particular simulation time in a memory;
    means for calculating a subsequent particular simulation time by adding the prime number to the particular simulation time; and
    means for storing the subsequent particular simulation time after operation of the means for engaging.

12. The system of claim 8 wherein:
    the plurality of prime numbers are selected from non-identical prime numbers.

13. The system of claim 12 wherein:
    the plurality of prime numbers are selected from the integers between 100 and 400.

14. The system of claim 8 further comprising:
    a counter to represent the simulation time.

15. A computer program product having a computer readable medium having computer program logic recorded thereon for testing a device using a plurality of transactions for simulation, the computer program product comprising:
    code for providing a plurality of prime numbers;
    code for associating each transaction of the plurality of transactions to a respective prime number of the plurality of prime numbers;
    code for engaging each transaction to the device at a particular simulation time that is based on the associated prime number of each transaction; and code for repeating the means for engaging for each transaction when the simulation time is an integer multiple its associated prime number.

16. The computer program product of claim 15 wherein a portion of the plurality of transactions form a test case, and the code for engaging comprises:

code for looking up the test case in a table of test case entries and locating a list of transactions associated with the test case;

code for looking up each transaction of the list of transaction in a table of transactions and locating information associated with each transaction in the table; and code for invoking a function for each transaction based on the information.

17. The computer program product of claim 16 further comprising:

code for invoking an emulator, via the function, to issue a command to the device based on the transaction.

18. The computer program product of claim 15 wherein the means for repeating comprises:

code for storing the particular simulation time in a memory;

code for calculating a subsequent particular simulation time by adding the prime number to the particular simulation time; and code for storing the subsequent particular simulation time after operation of the code for engaging.

19. The computer program product of claim 15 wherein:

the plurality of prime numbers are selected from non-identical prime numbers.

20. The computer program product of claim 19 wherein:

the plurality of prime numbers are selected from the integers between 100 and 400.

* * * * *